(12) United States Patent
McMorris

(10) Patent No.: US 6,889,628 B1
(45) Date of Patent: May 10, 2005

(54) CORN COB CHEW TOY

(75) Inventor: Roger G. McMorris, Independence, IA (US)

(73) Assignee: ICBP, Independence, IA (US)

( * ) Notice: Subject to any disclaimer, the term of this patent is extended or adjusted under 35 U.S.C. 154(b) by 6 days.

(21) Appl. No.: 10/700,610

(22) Filed: Nov. 4, 2003

(51) Int. Cl.$^7$ ............................ A01K 5/00; A01K 29/00
(52) U.S. Cl. .................................. 119/51.03; 119/710
(58) Field of Search ............................ 119/51.03, 709, 119/710, 711

(56) References Cited

U.S. PATENT DOCUMENTS

| | | | | |
|---|---|---|---|---|
| 3,537,429 A | * | 11/1970 | Regan | 119/51.03 |
| 3,638,617 A | * | 2/1972 | White | 119/51.03 |
| 3,871,334 A | * | 3/1975 | Axelrod | 119/710 |
| 4,343,261 A | | 8/1982 | Thomas | |
| 5,296,209 A | | 3/1994 | Simone et al. | |
| 5,407,661 A | | 4/1995 | Simone et al. | |
| 5,637,312 A | * | 6/1997 | Tock et al. | 119/51.03 |
| 6,085,692 A | * | 7/2000 | Adams | 119/51.03 |
| 6,178,922 B1 | | 1/2001 | Denesuk et al. | |
| 6,360,696 B1 | * | 3/2002 | Arnold et al. | 119/710 |
| 6,672,252 B1 | * | 1/2004 | Levin et al. | 119/709 |
| 2002/0119224 A1 | * | 8/2002 | Axelrod et al. | 426/132 |

FOREIGN PATENT DOCUMENTS

EP    0 552 897 A1    7/1993

* cited by examiner

*Primary Examiner*—Teri P. Luu
*Assistant Examiner*—Elizabeth Shaw
(74) *Attorney, Agent, or Firm*—McKee, Voorhees & Sease, P.L.C.

(57) ABSTRACT

This invention is directed to a composition and a method for wearing down rodents' teeth. A corn cob is soaked in an aqueous solution in which salt and/or vitamins and other nutrients are dissolved or suspended. The cob is subsequently dried leaving a cob infused and impregnated with the salt and/or vitamins and other nutrients. The treated cob is then provided to a rodent which chews on it, thus wearing down its teeth.

5 Claims, No Drawing Sheets

CORN COB CHEW TOY

BACKGROUND OF THE INVENTION

Because a rodent's teeth continually grow, the tooth surface must be constantly worn down or the animal cannot feed itself properly. For example, if a squirrel did not chew on hard things like nut shells, its teeth would grow too long. For this reason, there is a need for hard things that a pet rodent can chew on. The hard things should be plentiful, cheap and pleasing to the rodent to chew. Corn cobs soaked in salt brine with or without added vitamins and nutrients fill this requirement.

Other products utilize corn cobs in animal chew toys, but only after grinding the cob into small particles. For example, Simone et al. (U.S. Pat. Nos. 5,296,209, 5,407,661 & EP 0 552 897 A1) describes an edible pet chew containing cellulosic fibrous material generated from corn cobs. Corn cob fractions, ranging in particle size from about 20 to 250 microns make up about 25 to 35% of the composition of the chew by weight. The corn cob fractions are not digested, but increase roughage and bulk so as to assist the pet in the digestion of food. The chews, when chewed by a pet, effect a reduction in plaque, stain and tartar on the pet's teeth. However, no mention is made of wearing down teeth, or of utilizing a complete cob, as opposed to grinding the cob into particles.

BRIEF SUMMARY OF THE INVENTION

A chew toy for an animal comprises a corn cob impregnated with a flavoring agent. This invention is directed to a composition and a method for wearing down rodents' teeth. The corn cob is contemplated to be at least one centimeter in diameter, but preferably retains its full cross section, and is cut to a predetermined length. The cob can also be left entirely in its original size and it is never ground into particles less than 1 ml in volume. The cob can still return the kernels or not. The corn cob is soaked in a solution in which salt and/or vitamins and other nutrients are dissolved or suspended. The cob is subsequently dried leaving a cob infused and impregnated with the salt and/or vitamins and other nutrients. The treated cob is then provided to a rodent which chews on it, thus wearing down its teeth.

DETAILED DESCRIPTION OF THE PREFERRED EMBODIMENT

A corn cob is soaked in a solution in which salt and/or vitamins and other nutrients are dissolved or suspended. The cob is subsequently dried leaving a cob infused and impregnated with the salt and/or vitamins and other nutrients. By "salt," it is meant sodium chloride (NaCl). The salt and some of the other additives to the cob are to entice the rodent to chew on the cob. Saline solution or another beneficial solution may be introduced through a vacuum process resulting in greater penetration into the cellulosic structure.

Specific vitamins and nutrients, beneficial to rodent health, include dicalcium phosphate, calcium carbonate, iodized salt, choline chloride, vitamin A acetate, vitamin $D_3$ supplement, vitamin E supplement, niacin, calcium pantothenate, riboflavin, thiamine mononitrate, pyridoxine hydrochloride, menadione sodium bisulfite complex, folic acid, biotin, vitamin $B_{12}$ supplement, magnesium oxide, manganous oxide, ferrous sulfate, copper sulfate, zinc oxide, calcium iodate, cobalt carbonate and chromium potassium sulfate. The treated cob is then provided to a rodent which chews on it, thus wearing down its teeth. It is contemplated that the cob can be cut into shorter lengths, if only to better fit in a cage.

EXAMPLE 1

A shelled corn cob is soaked for one hour in an aqueous saturated salt (NaCl) solution at room temperature. The cob is removed and allowed to air dry. The result is a corn cob impregnated with salt.

EXAMPLE 2

A corn cob with kernels still attached is broken or cut into 4 roughly equal shorter lengths. The cob pieces are then soaked for one hour in a hot aqueous solution containing 40 g of sodium chloride, 0.5 g of ferrous sulfate, 0.5 g copper sulfate and 0.5 g calcium iodate per 500 ml solution. The cob pieces are removed and gently dried in a convection oven at 60° C. overnight. The dried cob is impregnated with the salts.

EXAMPLE 3

A shelled corn cob is soaked for one hour in a room temperature ethanol solution saturated with NaCl and containing 0.5 g folic acid per 500 ml solution. The cob is removed and gently dried in a convection oven at 50° C. overnight. The dried cob is impregnated with NaCl and folic acid.

EXAMPLE 4

A shelled corn cob is immersed and soaked for five minutes in an aqueous saturated salt solution at room temperature. A vacuum is pulled over the cob and solution such that air pockets inside the cob are removed. The vacuum is released. The solution has penetrated the cob. The cob is removed from the solution and gently dried in a vacuum oven at 50° C. overnight.

These examples are illustrative of various ways to practice the present invention, but other variations may be used so long as the cob particles are greater than one ml and the cob is soaked with a salt solution or other flavoring agent so as to impregnate the cob with the salt or other flavoring agent.

What is claimed is:

1. A method for making a chew toy comprising:
    shelling the kernels of corn from a corn cob;
    soaking the shelled corn cob for at least one hour in an aqueous saturated salt solution without breaking the corn cob into pieces whereby the corn cob is infused and impregnated with the salt of the salt solution;
    allowing the shelled corn cob to dry in the air after the soaking step;
    feeding the shelled corn cob infused and impregnated with the salt of the salt solution to a rodent, whereby the rodent is attracted to the salt taste of the corn cob and chews on the corn cob;
    using the corn cob to wear down the rodent's teeth while the rodent chews on the corn cob.

2. The method according to claim 1 and further comprising soaking the shelled corn cob in a room temperature ethanol solution saturated with salt and drying the corn cob in a convection oven at 50 degrees C.

3. The method according to claim 2 and further comprising soaking the shelled corn cob in a solution further containing folic acid, whereby the dried corn cob becomes impregnated with both the salt and folic acid.

4. A method for making a chew toy comprising:
shelling the kernels of corn off of a corn cob, the corn cob having a plurality of air pockets therein;
immersing the shelled corn cob in an unbroken or ground state in an aqueous saturated salt solution at room temperature;
pulling a vacuum over the shelled corn cob and the solution such that the air pockets inside the shelled corn cob are filled with the aqueous saturated salt solution;
releasing the vacuum after the aqueous saturated salt solution has penetrated the shelled corn cob;
drying the shelled corn cob in an oven;
feeding the shelled corn cob infused and impregnated with the salt from the salt solution to a rodent, the rodent being attracted to the salt taste of the shelled corn cob and chewing on the shelled corn cob;
using the shelled corn cob to wear down the rodent's teeth while the rodent chews on the shelled corn cob.

5. A method for making a chew toy comprising:
taking a corn cob with kernels of corn on it;
breaking the corn cob into no more than 4 equal shorter lengths;
soaking the corn cob with the kernels of corn on it for one hour in a hot aqueous salt solution whereby the corn cob becomes infused and impregnated with the salt within the salt solution;
drying the corn cob with the kernels of corn on it;
feeding the corn cob infused and impregnated with the salt from the salt solution to a rodent which is attracted to the salt taste of the corn cob whereby the rodent chews on the corn cob;
using the corn cob to wear down the rodent's teeth while the rodent chews on the corn cob.

* * * * *